United States Patent [19]

Fagerdahl

[11] Patent Number: 5,661,995

[45] Date of Patent: Sep. 2, 1997

[54] ALIGNER FOR DAMAGED VEHICLE BODYWORK AND VEHICLE CHASSIS

[75] Inventor: Sten Fagerdahl, Orebro, Sweden

[73] Assignee: Josam Lastbilteknik AB, Sweden

[21] Appl. No.: 545,600

[22] PCT Filed: Apr. 28, 1994

[86] PCT No.: PCT/SE94/00384

§ 371 Date: Dec. 29, 1995

§ 102(e) Date: Dec. 29, 1995

[87] PCT Pub. No.: WO94/25192

PCT Pub. Date: Nov. 10, 1994

[30] Foreign Application Priority Data

Apr. 30, 1993 [SE] Sweden ............................ 9301484

[51] Int. Cl.$^6$ ............................................. B21J 13/08
[52] U.S. Cl. .................................. 72/457; 72/705
[58] Field of Search ....................... 72/705, 457, 455, 72/389

[56] References Cited

U.S. PATENT DOCUMENTS

| | | | |
|---|---|---|---|
| 3,122,194 | 2/1964 | Bronson et al. | 153/32 |
| 4,281,532 | 8/1981 | Covington | 72/457 |
| 4,309,895 | 1/1982 | Samuelsson | 72/457 |
| 4,475,716 | 10/1984 | Jarmin et al. | 72/705 |
| 4,574,613 | 3/1986 | Doughty | 72/705 |
| 4,590,732 | 5/1986 | Hallman | 72/705 |
| 4,658,627 | 4/1987 | Brewer, Sr. | 72/705 |
| 4,720,991 | 1/1988 | Kuhn | 72/705 |
| 4,813,264 | 3/1989 | Trice | 72/705 |

FOREIGN PATENT DOCUMENTS

| | | |
|---|---|---|
| 2204792 | 8/1972 | Germany . |
| 422015 | 2/1982 | Sweden . |
| 1379076 | 1/1975 | United Kingdom . |

*Primary Examiner*—Lowell A. Larson
*Assistant Examiner*—Ed Tolan
*Attorney, Agent, or Firm*—Hayes, Soloway, Hennessey, Grossman & Hage, P.C.

[57] ABSTRACT

The present invention relates to an aligner for damaged vehicle bodywork and vehicle chassis, which aligner is equipped with folding wheels (19) capable of adjustment between a working position and a transport position. In the working position, the aligner is in contact with a floor or the like, and in the transport position, the aligner adopts a free position relative to the floor. The aligner consists of a lower part (1) executed as a frame and an upper part (2), a so-called slide, supported therein in such a way as to be capable of displacement, which upper part is so arranged as to be caused to move in the longitudinal sense of the lower part by at least one actuating device (12) arranged in the lower part (1). The upper part (2) is executed with a uniform longitudinal cross-sectional profile, which engages in a corresponding uniform longitudinal cross-sectional profile on the lower part (1) and permits the upper part (2) to be caused to move in the lower part (1) with stable support for its entire length. Both the lower part and the upper part are executed in their interacting parts with dovetail-shaped profiles which engage in one another. Both the lower part (1) and the upper part (2) are preferably aluminum components.

9 Claims, 3 Drawing Sheets

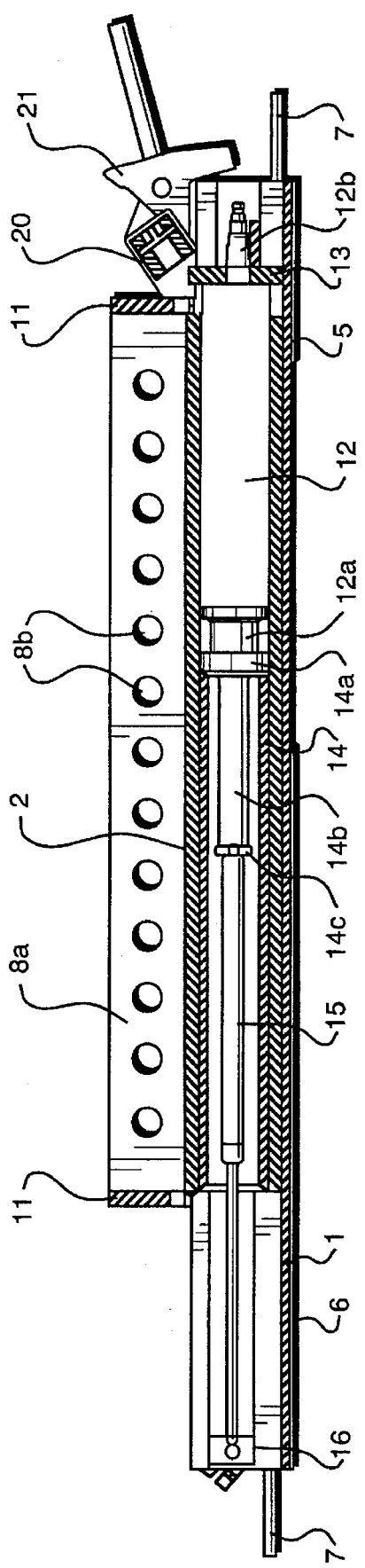
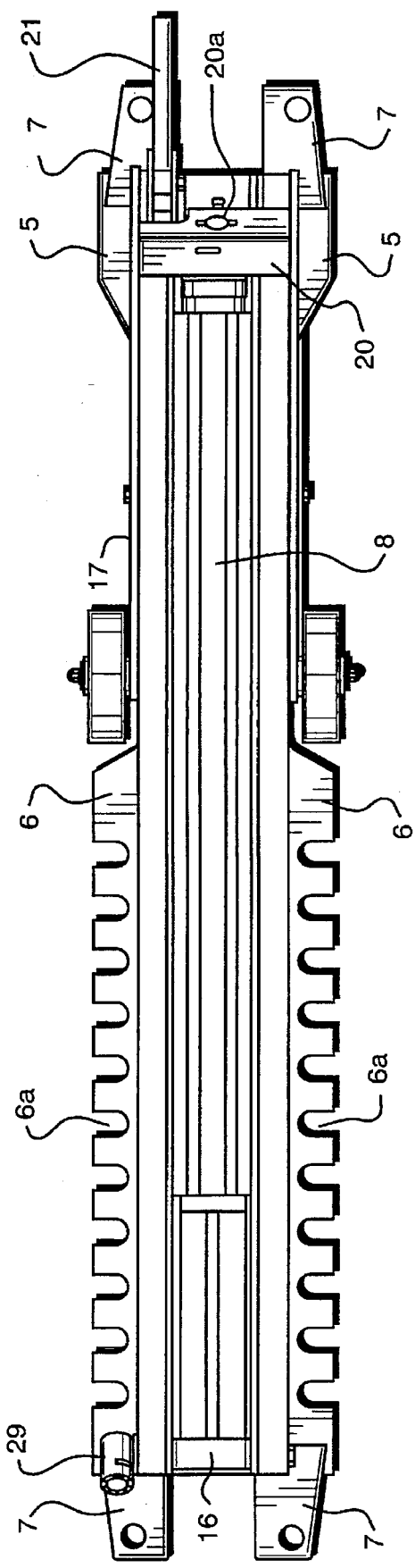
FIG. 1
FIG. 2

ALIGNER FOR DAMAGED VEHICLE BODYWORK AND VEHICLE CHASSIS

The present invention relates to an aligner for damaged vehicle bodywork and vehicle chassis and represents a further development of the aligner arrangement in accordance with Swedish Patent No. 7712423 (U.S. Pat. No. 4,309,895).

The aforementioned previously disclosed aligner arrangement has proved to be appropriate for the repair and alignment of damaged vehicles, most of all in conjunction with the alignment of damaged vehicle cabs and car bodywork. The advantages are largely attributable to the adaptability of the aligner arrangement to all forms of damage to a vehicle unit, as well as to the premises concerned. This was made possible by the fact that the aligner arrangement in question is a portable aligner equipped with folding wheels, which permit alternative positioning of the aligner unit in relation to the damaged vehicle and also permit the aligner to be lowered into contact with a workshop floor and secured to it by means of bolted connections or similar clamping devices. In the aforementioned previously disclosed embodiment, the aligner comprises a longitudinal alignment bar executed with a longitudinal guide for a carriage supported in such a way as to be capable of displacement. This is supported in roller bearings in the aligner and is equipped with alignment devices for exerting a pulling or pushing effect on the damaged vehicle unit. The force required for performing such operations is provided via controlled displacement movements of the carriage relative to the alignment bar, which movements are counter-balanced by servo-controlled actuating devices, for example hydraulic devices, anchored to the alignment bar. Forces acting obliquely in relation to the longitudinal extent of the alignment bar often make their effect felt during such operations. This imposes considerable stresses on the roller bearings and gives rise to higher surface pressures in the bearing channels of the alignment bar, which stresses cause wear to take place which reduces the service life of said units.

The object of the present invention is to eliminate the aforementioned disadvantages and to increase the effective power range of such aligners, and also to facilitate the manageability of such aligners through a reduction in weight and a simplified wheel positioning mechanism. Like the previously disclosed aligner arrangement, the invention relates to a portable longitudinal aligner equipped with folding wheels capable of adjustment between a working position, in which the aligner is in contact with a floor or the like, and a transport position, in which the aligner adopts a free position relative to the floor. The aligner in accordance with the present invention consists of a lower part executed as a frame and an upper part, a so-called slide, supported therein in such a way as to be capable of displacement, which upper part is so arranged as to be caused to move in the longitudinal sense of the lower part by at least one actuating device arranged therein. The invention is thus characterized in that the upper part is executed with a uniform longitudinal cross-sectional profile, which engages in a corresponding uniform longitudinal cross-sectional profile on the lower part and that the lower part and the upper part are executed in their interacting parts with dovetail-shaped profiles which engage in each other and permits the upper part to be caused to move relative to the lower part with stable support for its entire length. The longitudinal extent of the upper part is preferably more than two thirds of the longitudinal extent of the lower part, which means that the relative displacement of the upper part in the lower part cannot exceed one third of the length of the lower part. The lower part, the so called frame, and the upper part, the so called slide, are preferably aluminium components.

The invention is further characterized in that the lateral surfaces of the upper part have male dovetail-shaped projections which engage in female dovetail-shaped grooves on the inner lateral surfaces of the lower part. In the aforementioned respects, the invention is characterized in that there are arranged between the lower part and the upper part sliding strips, which prefererably have dovetail-shaped attachments to the upper part.

Other characteristic features of the invention can be appreciated from the following description and Patent Claims. The description of an embodiment exemplifying the invention is given with reference to the accompanying drawings, in which FIG. 1 shows a longitudinal section through the aligner in accordance with the invention without alignment devices;

FIG. 2 Shows a plan view of the aligner without alignment devices;

Figure 3:
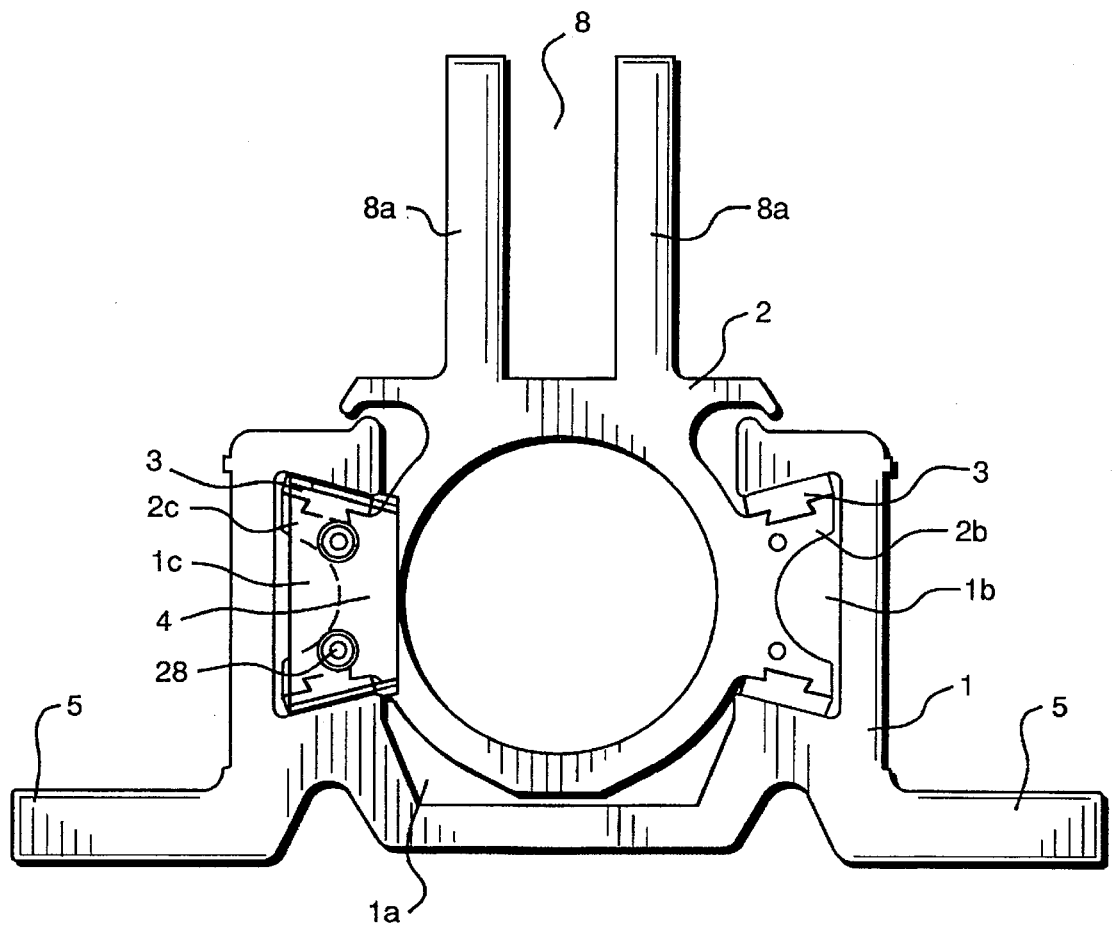
FIG. 3 shows a cross-section through the supporting profiles of the aligner in interaction with one another.
Figure 4:
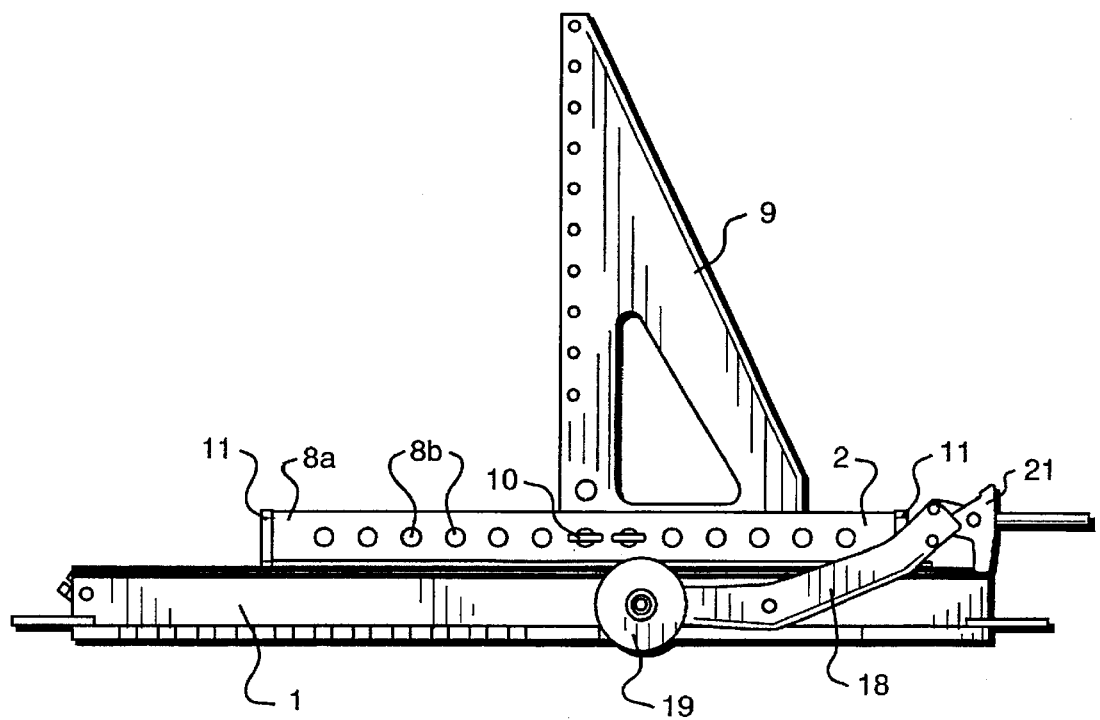
FIG. 4 shows a side view of a part of the aligner equipped with a wheel carrier and an alignment device.
Figure 5:
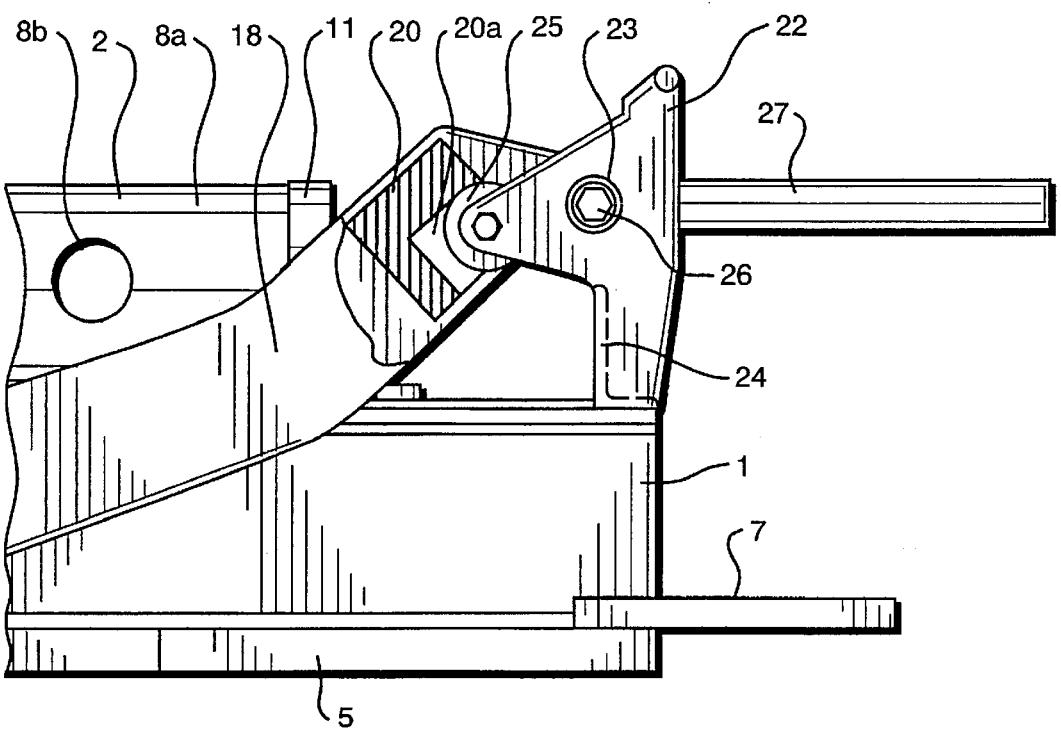
FIG. 5 illustrates the interaction of the wheel carrier with a locking mechanism as a partially cut-away cross-sectional view.

In accordance with FIG. 3, the aligner in accordance with the invention consists essentially of a lower part 1 and an upper part 2, the cross-sectional profiles of which are designed for interaction with one another in that the upper part 2 is executed on its sides with dovetail-shaped heels 2b,2c, so-called male heels, which engage in corresponding dovetail-shaped recesses 1b,1c, so-called female channels, on the insides of a U-shaped groove 1a in the lower part 1. The upper part 2, like the lower part 1, extends in a longitudinal sense, and the longitudinal extent of the upper part is approximately two thirds of the longitudinal extent of the lower part. The upper part 2 is supported on the lower part 1 in such a way as to be capable of displacement. With regard to this, the dovetail-shaped heels 2b,2c of the upper part 2 are executed on their inclined sides with dovetail-shaped recesses for sliding strips 3, which are fixed in position on the heels 2b,2c with a locking plate 4 and a couple of screws 28 at either end of the two dovetail-shaped heels 2b,2c on the upper part 2. The locking plates 4 thus act as scrapers to keep the sliding surfaces free from dirt. FIG. 3 shows only a single heel 2c fitted with a sliding strip 3, however.

The lower part 1 is executed, as previously mentioned, with a longitudinal U-shaped groove 1a, in which the upper part 2 is supported in such a way that it is capable of displacement. The lower part 1 is executed with support plates 5,6 on the sides of the aforementioned groove 1a, so as to permit contact with a floor with a width greater than the groove 1a. As can be appreciated from FIG. 2, the two support plates 5 at one end of the lower part 1 exhibit a comparatively small extent in the longitudinal sense of the lower part 1. Attached to the aforementioned support plates 5 are two perforated attachment plates 7, so-called ears.

The other end of the lower part 1 is executed for more than half of its longitudinal extent with two longitudinal support plates 6, and two perforated attachment plates 7, so-called ears, are attached to the outer end of said support plates. All these perforated attachment plates 7 extend in a longitudinal sense outside the profiled form of the lower part 1, so as to permit contact between the aligner and a cab bench or similar arrangement.

The support plates 6 are provided on their two longitudinal sides with a row of open slots 6a spaced at regular intervals, so as to permit alternative attachment of the lower part 1 and the aligner to the floor, for example a workshop floor or similar base.

The top of the upper part 2 is executed with two longitudinal parallel walls 8a, which together form a channel 8 of U-shaped cross-section. The aforementioned channel 8 provides a guide for an alignment device applied between the walls 8a, for example a bracket 9. To permit the attachment of the alignment device 9 in alternative positions, the walls forming the channel 8 are provided with a number of transverse holes 8b in a row. Inserted in the aforementioned holes are transverse bolts or pins 10, which pass through the alignment device 9 and lock it in position relative to the upper part 2. Each of the ends of the channel 8 in the upper part 2 is closed with its own blanking plate 11.

The upper part 2 and any alignment device 9 attached to it are intended to be caused to be displaced during a work operation. Such displacement movements are counterbalanced by the effect of servo-controlled actuating devices anchored to the lower part 1. These consist of an hydraulic unit comprising a piston-cylinder unit 12, which is attached in a longitudinal sense inside the lower part 1 and in contact with a transverse brace 13 at one end of the lower part 1, in conjunction with which a central nipple 12b in the end of the cylinder passes through a clearance hole in the brace 13 for attachment to a pressure source.

At the other end, the piston 12a is in contact with an end plug 14a on a longitudinal tube 14, which is rigidly attached to the upper part 2. The end plug 14a is an integral part of an inner tube 14b, which engages with the longitudinal tube 14, and the inner end of the inner tube is executed with a washer-shaped bearing 14c for a gas spring 15. The gas spring 15 is articulately mounted at its other end in a bearing attachment 16 attached in a transverse sense in the lower part 1.

The illustrative embodiment relates to an aligner executed as a press bridge, in conjunction with which the purpose of the gas spring 15 is to return the piston 12a to its initial position whenever the working pressure inside the cylinder 12 permits it.

Once a work operation is complete, it may be desirable to move the aligner to another working position or to a storage place. In order to do this, it will be necessary to release any attachment bolts for the aligner and to move the aligner with the help of a wheel carrier 17 integrated in The wheel carrier 17 is executed as a U-shaped balance arm and consists of two two-armed lever arms 18, the upper ends of which are rigidly attached to one another via a handle bracket 20 capable of being assembled with screws. The wheel carrier 17 is articulately mounted on the lower part 1, the so-called frame, in that each of the lever arms 18 is pivotally mounted via a screwed connection to its own outside of the lower part 1. Rotatably mounted out the outside of each lever arm is at its lower end is a wheel 19.

Executed at the centre of the handle bracket 20 is a guide hole 20a for an actuating lever (not shown), which is designed to be inserted in the guide hole 20a. By the application of force to the actuating lever, the wheel carrier 17 can be caused to pivot about its bearing centres so that the wheels 19 are pivoted upwards from the floor. The parallelism formed between the bearing centres of the lever arms and the handle bracket 20 causes simultaneous pivoting movements of the wheel carrier for both wheels 19.

In order to secure the wheels 19 in certain predetermined positions, the wheel carrier 17 is so arranged as to interact with a locking mechanism 21. This consists of two parallel plates 22, which are rigidly connected to one another via a common hub 23 and a laterally arranged angle iron 24. A roller 25 is also pivotally mounted between the aforementioned plates 22. The locking mechanism 21 is pivotally mounted through the hub 23 on a pivot pin 26, which is attached to the inside of the upper part of one of the lever arms 18. Attached between the plates 22 and in contact with the hub 23 is a handle 27, by means of which the locking mechanism can be actuated to various positions.

When the aligner arrangement adopts its working position, the locking mechanism 21 is disconnected and the wheel carrier 17 then adopts a position with the wheels 19 raised or disengaged from the floor.

When the aligner is to be moved, the actuating lever is raised, in conjunction with which the wheel carrier 17 is caused to rotate about its bearings in such a way that the wheels 19 are brought into contact with the floor. For a given angle of rotation of the wheel carrier 17, the locking mechanism is rotated by its own weight so that the angle iron 24 will come to rest edgeways against the top side of the lower part 1. The aforementioned position is the so-called transport position of the aligner, and in the same position the lower part 1 is free relative to the floor.

When the aligner arrangement is to be lowered into contact with the floor, the operating lever must first be raised, whereupon the locking mechanism is manually actuated to provide disengagement, for example with the foot, so that the wheel carrier 17 can be rotated into the working position.

Figure 6A:
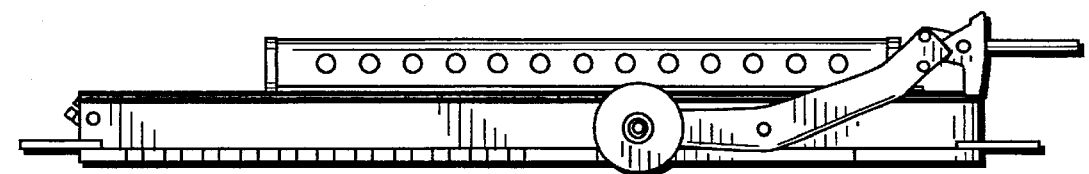
FIGS. 6A, 6B and 6C illustrate three different positions for the aligner in relation to the floor.
Figure 6B:
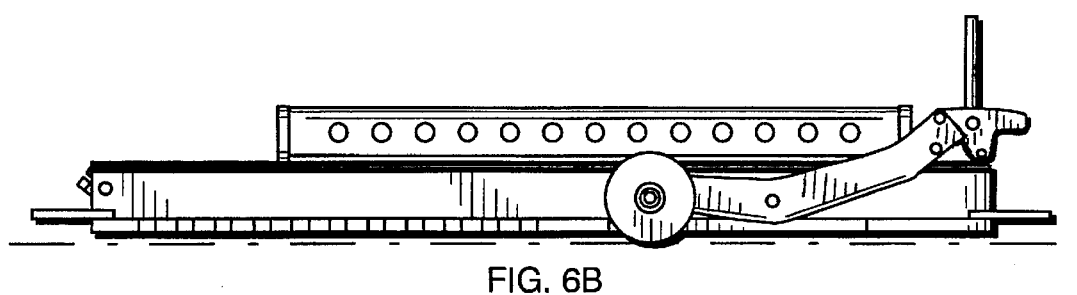
Figure 6C:
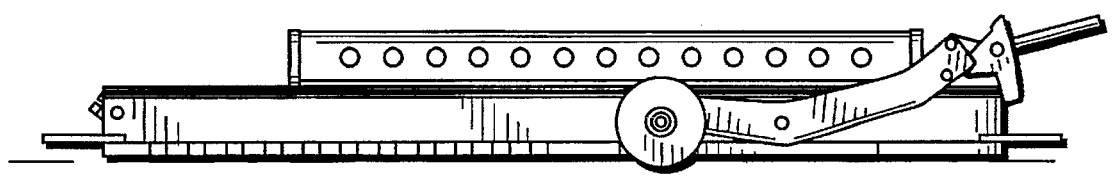

By manual actuation of the handle 27 on the locking mechanism 21 in the opposite direction of rotation to that described previously, a small amount of rotation can be imparted to the wheel carrier 17, providing limited raising of the aligner from the floor, thereby permitting fine adjustment of the working position of the aligner relative to the damaged vehicle; see FIG. 6B. The aforementioned rotational movement is limited so that the roller 25 on the locking mechanism 21 is forced into contact with the wall in a recess 20a in the handle bracket 20.

A handle attachment 29 is rigidly connected to the lower part 1 and the bearing attachment 16 at the other end of the aligner. This is executed with guide holes for alternative mounting of the previously mentioned operating lever when the aligner is to be moved.

The invention is not limited to the embodiment described here, but may be modified within the context of the following Patent Claims to provide alternative embodiments. It has been possible until now to design the hydraulic unit of the aligner with a double-acting piston-cylinder or with a single-acting piston-cylinder arranged to either side of the lower part of the slide in the frame.

I claim:

1. In an aligner for damaged vehicle body and chassis repair having a frame adapted to be secured to a floor or the like, the aligner being equipped with folding wheels capable of adjustment between a working position, in which the aligner is in contact with a floor or the like, and a transport position, in which the aligner adopts a free position relative to the floor, the aligner having a slide supported for movement within the flame to transmit a repair force to the vehicle and an actuating device carried by the frame for moving the slide, the improvement wherein the slide and frame each have uniform cross sectional profiles with inter-engaging dove tails along their lengths, the slide dove tail engaging the frame dovetail throughout the movement of the slide with respect to the frame to provide stable support for the slide throughout its length.

2. Aligner in accordance with claim 1 wherein both the frame and the slide are die-cast components.

3. Aligner in accordance with claim 2 wherein both the frame and the slide are die-cast aluminum.

4. Aligner in accordance with claim 2, wherein the longitudinal extent of the slide is more than two thirds of the longitudinal extent of the frame.

5. Aligner in accordance with claim 4, wherein the lateral surfaces of the slide have male dovetail-shaped projections which engage in female dovetail-shaped grooves on lateral surfaces of the frame.

6. Aligner in accordance with claim 5, wherein interacting dovetail-shaped profiles having longitudinal sliding strips with dovetail-shaped attachments are provided between the frame and the slide.

7. Aligner in accordance with claim 6, wherein the frame is provided with support plates to permit broad contact with a floor or the like.

8. Aligner in accordance with claim 7, wherein the support plates are provided on their sides with a number of open slots spaced at regular intervals to permit attachment of the aligner to a floor or the like.

9. Aligner in accordance with claim 8, wherein the slide is provided on its top side with two longitudinal parallel walls, which together form a channel for an adjustment device, and in that the aforementioned walls are provided with a number of transverse holes in a row for the attachment of such adjustment device in the slide with bolts or pins.

* * * * *